FLUID SAMPLING VALVE
Filed Feb. 14, 1962 3 Sheets-Sheet 1
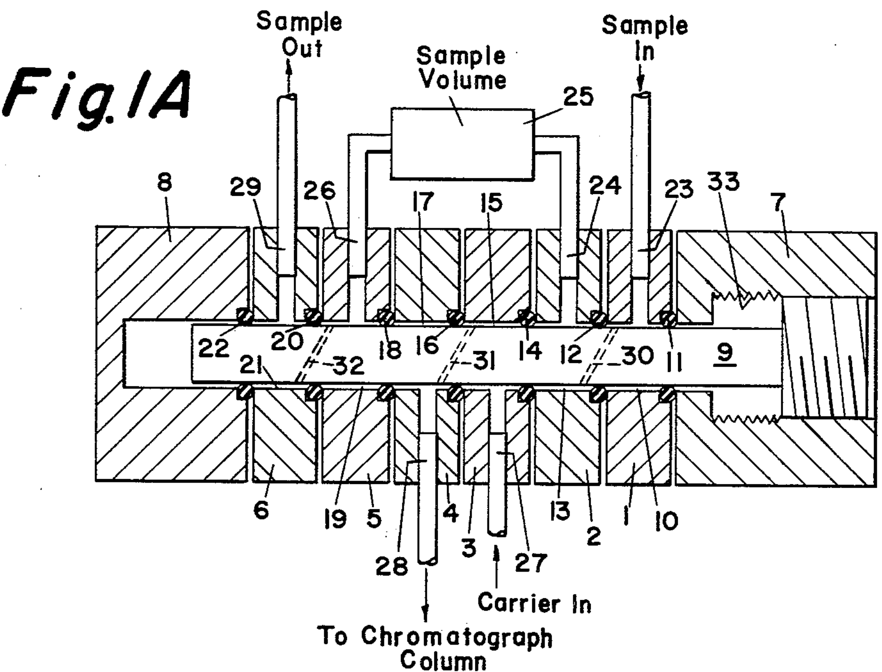
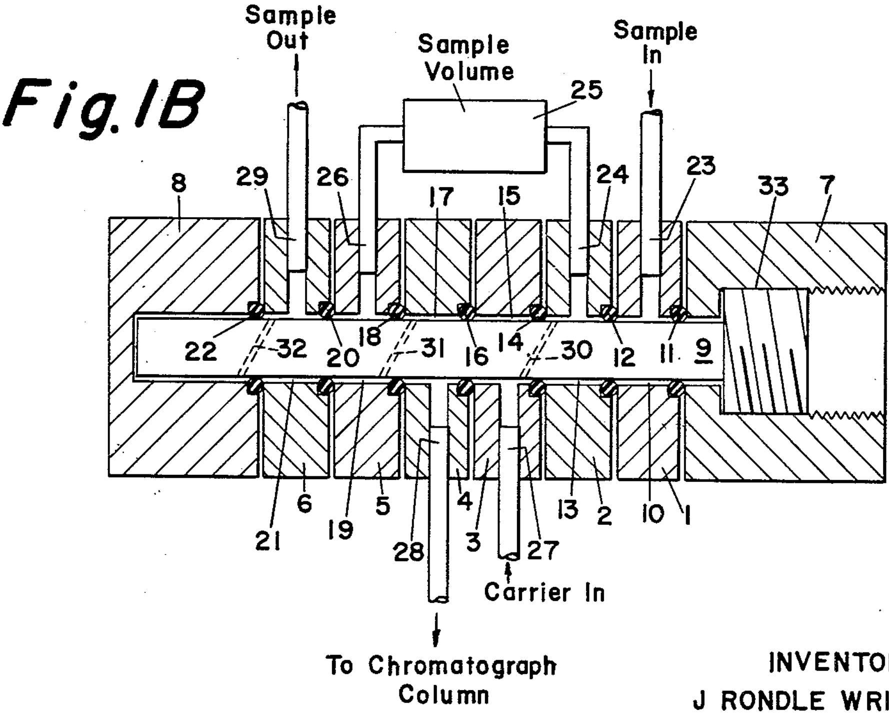
INVENTOR.
J RONDLE WRIGHT
BY George L. Church
ATTORNEY FLUID SAMPLING VALVE
Filed Feb. 14, 1962 3 Sheets-Sheet 2
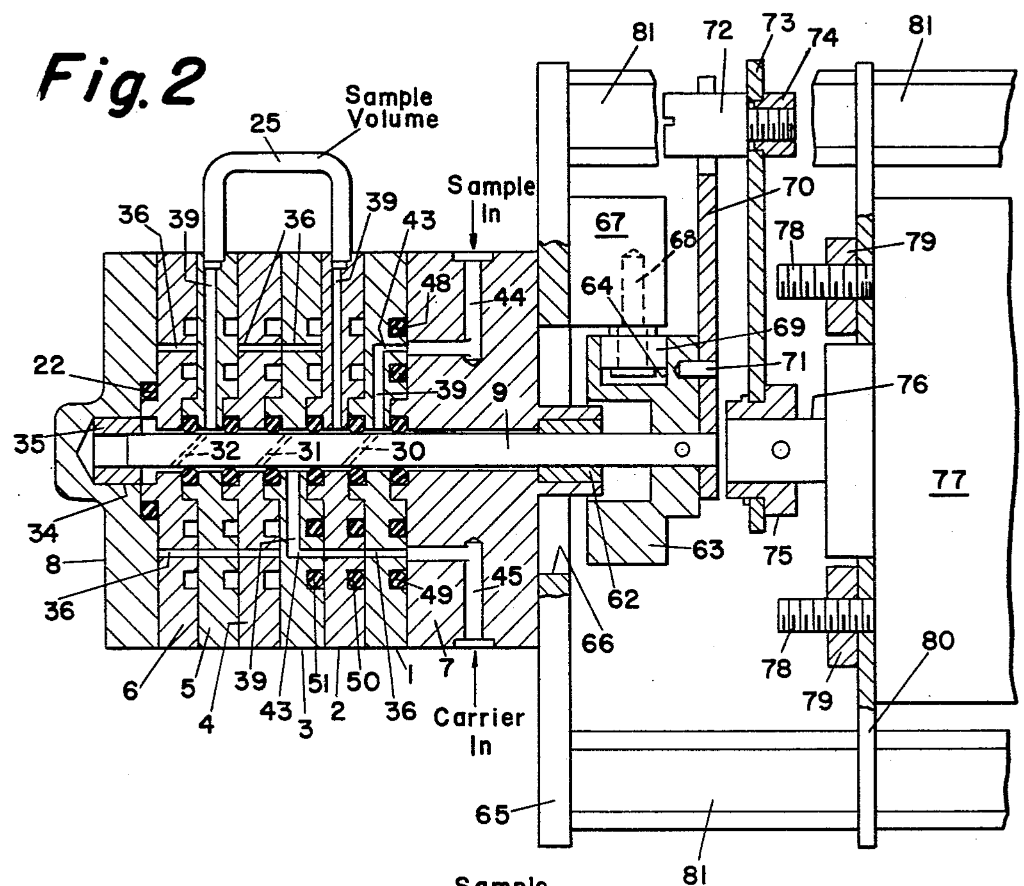
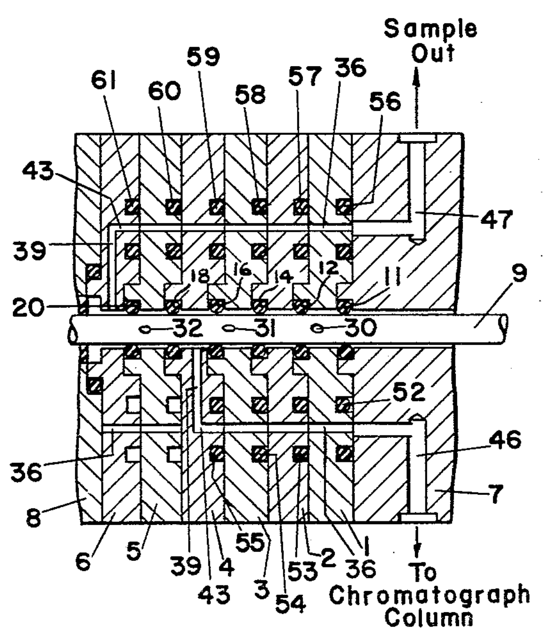
Fig. 5
INVENTOR.
J RONDLE WRIGHT
BY George L. Church
ATTORNEY

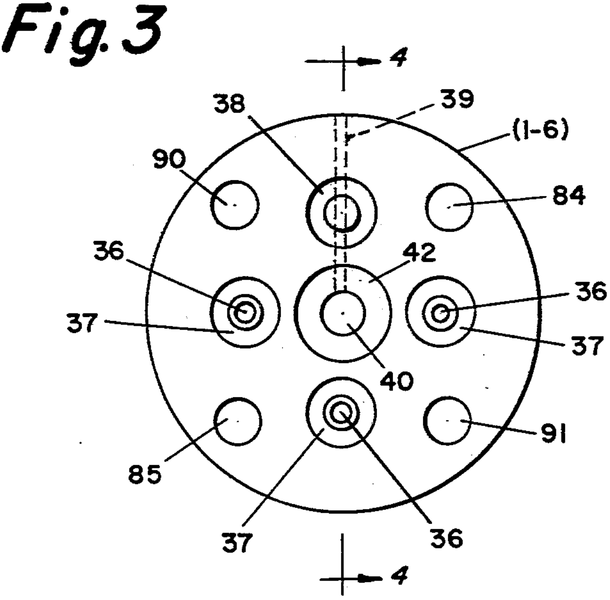
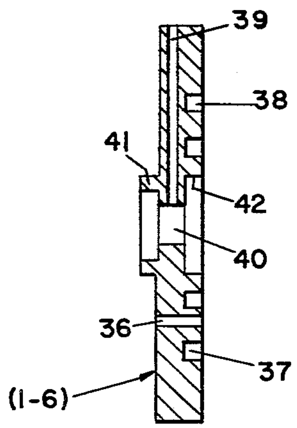
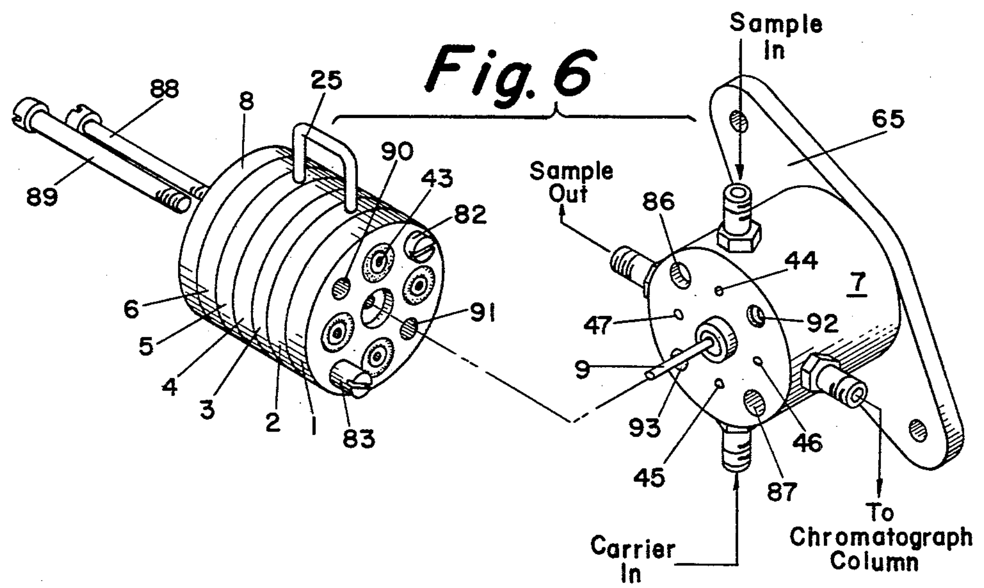
INVENTOR.
J RONDLE WRIGHT
BY George L. Church
ATTORNEY United States Patent Office 3,122,168
Patented Feb. 25, 1964

1

3,122,168
FLUID SAMPLING VALVE

J Rondle Wright, Newtown Square, Pa., assignor to Sun Oil Company, Philadelphia, Pa., a corporation of New Jersey Filed Feb. 14, 1962, Ser. No. 173,213
6 Claims. (Cl. 137—625.48)

This invention relates to apparatus for transferring to a main fluid stream a quantity of fluid from an auxiliary fluid stream, and more particularly to an improved valve construction for intermittently injecting into a continuously flowing main fluid stream a predetermined volume of fluid (i.e., a sample) from an auxiliary fluid (or sample) stream. Valves of the type aforesaid, known as fluid sampling or sample injecting valves, are commonly utilized in connection with gas chromatography, for injecting fluid samples into a sweep or carrier gas stream, prior to the partitioning column of the chromatograph.

Valves which have been used in the past for automatically introducing fluid samples into gas chromatograph columns may be divided into two general classes. The so-called "linear" valve was the first to be used. This utilizes a piston, carrying several O-rings and operating to shift the port connections of a cylinder in which the piston moves. The linear motion of the piston is produced by a motor, usually of the compressed-air type. Valves of this type require a very smooth, accurately machined cylinder, for proper sealing; such a construction presents difficulties in the way of fabrication. In addition, O-rings have a tendency to "freeze" to a sealing surface with which they are associated for any length of time, so that a very large force is required to move them in a linear direction, as is required by a "linear" valve; this calls for a motor of very high power capability, which is economically undesirable.

The second general class of fluid sampling valves is the so-called "rotary" type, in which two polished surfaces are used to connect ports. In this type, one surface is made to rotate with respect to another, thereby changing the port connections. These surfaces must be highly polished, for effective sealing; such highly polished surfaces call for considerable rotary power, to overcome the frictional forces between the surfaces. Again, the high power requirements constitute a drawback.

An object of this invention is to provide a novel fluid sampling valve.

Another object is to provide a sample injecting valve which requires only a very small force for its operation.

A further object is to provide a fluid sampling valve somewhat similar to the "linear" valve, but in which the port connections of the cylinder are shifted by spiral motion of the piston.

A still further object is to provide a fluid sampling valve so constructed and arranged that the entire valve can be removed and replaced with another, by a very simple and rapid operation.

Still another object is to provide a sample injecting valve of such construction that it is considerably easier to fabricate, and therefore more economical, than are "linear" valves of the prior art.

The objects of this invention are accomplished, briefly, in the following manner: A plurality of disks, each having therein a central hole, are stacked together to form a bored valve body. A cylindrical rod of small diameter, having a polished outer surface, is mounted for movement within the body bore, the latter providing a cylinder. This rod, which functions as a piston member, is constrained to move in a helical path with respect to the axis of the bore, in response to a rotary force applied to one end thereof by means of a rotary solenoid. The annular space between the piston member and the wall of the valve bore is separated into a plurality of annular chambers by means of fixed O-rings which sealingly engage the outer surface of the piston, each of these annular chambers being connected through the valve body to a respective external connection. The piston member is provided with flow channels which extend across respective O-rings, to thereby interconnect adjacent chambers separated by the respective O-rings; in response to linear or translatory movement of the piston, the particular chambers interconnected by the channels are varied.

2

A detailed description of the invention follows, taken in conjunction with the accompanying drawings, wherein:

FIG. 1A is a sectional view of a chromatographic sampling valve, schematically illustrating the principles utilized in the present invention, the valve being illustrated in the "normal" or "purge" position;

FIG. 1B is a view similar to FIG. 1A, but illustrating the valve in the "operated" or "sampling" position;

FIG. 2 is a sectional view of a chromatographic sampling valve according to this invention;

FIG. 3 is a face view of a basic disk or wafer;

FIG. 4 is a section taken along line 4—4 of FIG. 3;

FIG. 5 is a partial sectional view similar to FIG. 2, the section being taken at 90° relative to the section of FIG. 2; and FIG. 6 is an exploded view of two subassemblies of the sampling valve of FIGS. 2 and 5, to wit, the disk subassembly and the bottom end cap subassembly.

The fluid sampling valve of this invention is generally similar to the so-called "linear" valve. However, the piston, cylinder, and ports are made very small, in order to reduce the force necessary for operation of the valve. Fluid seals are made by small O-rings.

Refer first to FIGS. 1A and 1B, which illustrate the principles of the present invention as applied to a complete chromatographic fluid sampling valve. Six disks, numbered respectively 1 through 6, are assembled in stacked relation and are held together (in a manner to be described hereinafter) between the two end pieces or end caps 7 and 8. Each of the disks has a central hole therethrough, so that when they are assembled they together form a valve body having an elongated central bore therein.

A cylindrical rod 9 of rather small diameter is mounted for movement within the valve bore, which latter provides a cylinder. The diameter of rod 9, which rod may be thought of as a piston member operating within the valve body cylinder or bore, is slightly less than the diameter of the valve bore (holes in the disks), so as to leave an annular space or clearance between member 9 and the wall of the valve bore. This annular space is separated into a plurality of annular chambers by means of fixed O-rings which are fixedly mounted in the valve body by being firmly clamped between the disks, are mounted in grooves in the respective disks, and sealingly engage the outer surface of piston member 9. The outer surface of piston member 9 is highly polished, so it can be turned in the snug-fitting O-rings with the least amount of force. In this connection, it is noted that, since the O-rings are carried by the cylinder, rather than by the piston, an accurately-machined cylinder (to wit, the holes in the disks) is not needed, although of course, the piston must be polished smooth and to some degree of accuracy; however, it is much easier to fabricate a smooth and accurate piston, than a smooth and accurate cylinder.

The annular chamber 10 within disk 1 is bounded at its ends by the respective O-rings 11 and 12. The annular chamber 13 within disk 2 is bounded at its ends by the respective O-rings 12 and 14. The annular chamber 15 within disk 3 is bounded at its ends by the respective O-rings 14 and 16. The annular chamber 17 within disk 4 is bounded at its ends by respective O-rings 16 and 18. The annular chamber 19 within disk 5 is bounded at its ends by respective O-rings 18 and 20. Finally, the sixth annular chamber 21 within disk 6 is bounded at its ends by respective O-rings 20 and 22. It is not necessary, for sealing purposes, that O-ring 22 actually contact member 9, but it can be spaced therefrom, in order to reduce the total friction between the moving piston member and the O-rings; this will be further referred to hereinafter.

Each of the disks 1 through 6 carries a respective one of the ports which are to be switched by the fluid sampling valve. These ports include channels formed in the respective disks in a manner to be particularly described hereinafter, the inner end of each channel communicating with a respective one of the annular chambers in the valve and the outer end of each channel leading into a respective fitting whereby external connections may be made to the respective channels. Disk 1 carries port 23 whose outer end is coupled to a sample fluid source and whose inner end is coupled to annular chamber 10; port 23 thus conveys sample fluid into chamber 10. Disk 2 carries port 24 whose inner end is coupled to annular chamber 13 and whose outer end is coupled to one end of a sample volume 25 which may be simply a short length of tubing. Disk 5 carries port 26 whose inner end is coupled to annular chamber 19 and whose outer end is coupled to the other end of the sample volume 25. Disk 3 carries port 27 whose outer end is coupled to a source of carrier gas (e.g., an inert gas such as helium) and whose inner end is coupled to annular chamber 15; port 27 thus conveys carrier gas into chamber 15. Disk 4 carries port 28 whose inner end is coupled to annular chamber 17 and whose outer end is coupled to the partioning column of a chromatograph; port 28 thus conveys fluid from chamber 17 to the chromatograph. Disk 6 carries port 29 whose inner end is coupled to annular chamber 21 and whose outer end is coupled to a "Sample Out" line or conduit, such as a vent; port 29 thus conveys fluid from chamber 21 to the "Sample Out" line.

The piston member 9 carries three spaced channels each of which is adapted to extend across or span one of the O-rings, so that each channel can interconnect that pair of adjacent annular chambers which are separated by the O-ring spanned by the respective channel. By way of example, these three spaced channels are provided by three diagonal holes 30, 31, and 32 which extend through the rod 9 more or less centrally thereof, passing through the longitudinal axis of the rod.

The valve of the invention is provided with means for causing the piston member 9 to move in a helical path with respect to the common axis of annular chambers 10, 13, 15, 17, 19, and 21, i.e., with respect to the axis of the valve bore. Such means is schematically illustrated in FIGS. 1A and 1B as a thread or spiral 33 in end cap 7 which engages a thread on the piston 9. Thus, when the piston 9 is turned or rotated, it also advances (i.e., it also moves linearly) in the cylinder formed by the holes in the stacked disks 1 through 6. A particular means for causing the helical or spiral motion 9 will be described hereinafter.

FIG. 1A illustrates the position of the piston 9 and of the holes 30, 31, and 32 therein, for the "normal" or "purge" position of the valve, while FIG. 1B illustrates the "operated" or "sampling" position of the valve, i.e., after piston 9 has advanced linearly to the left (along with its rotation).

In the "purge" position of the fluid sampling valve (FIG. 1A), hole 30 extends across O-ring 12, so that annular chambers 10 and 13 are placed in communication via hole 30. Then, the sample flows into chamber 10 via port 23, and from chamber 10 it flows via hole 30 into chamber 13, and thence through port 24, sample volume 25 and port 26 into chamber 19. In the "purge" position of the valve, hole 32 extends across O-ring 20, so that annular chambers 19 and 21 are placed in communication via hole 32. Hence, from chamber 19 the flow continues via hole 32 into chamber 21, and thence out port 29 to the "Sample Out" line.

In the "purge" position of the valve, hole 31 extends across O-ring 16, so that annular chambers 15 and 17 are placed in communication via hole 31. Therefore, in this valve position, carrier gas flows into chamber 15 via port 27, from whence the flow is via hole 31 into chamber 17 and out port 28 to the chromatograph.

When the valve operates, the diagonal holes in the piston 9 move up to the positions illustrated in FIG. 1B. Now, diagonal hole 30 extends across O-ring 14, so that chambers 13 and 15 are placed in communication by way of this hole. At the same time, diagonal hole 31 extends across O-ring 18, so that chambers 17 and 19 are placed in communication by way of this hole.

In the "sampling" position of the valve (FIG. 1B), the flow of sample is effectively cut off or stopped since there is no longer any way for sample to flow out of annular chamber 10. Thus, one end of the sample volume 25 is disconnected from the sample source. The "Sample Out" line 29 is now connected only to the closed chamber to the left of O-ring 22, by means of diagonal hole 32. Thus, the other end of sample volume 25 is disconnected from the sample vent.

In the "sampling" position of the valve, the carrier gas flows into chamber 15 via port 27, thence through diagonal hole 30, chamber 13, port 24, sample volume 25, where it picks up the sample, port 26, chamber 19, diagonal hole 31, chamber 17, and port 28 to the chromatograph column.

The diagonal holes 30, 31, and 32 in piston 9 can be replaced by any kind of channels which are each long enough to extend across one of the O-rings, e.g. a "flat" on the piston, or a short groove.

It will be noted that, when the valve "operates" or moves to its "sampling" position, the initial motion of the piston 9 is a rotary one. This motion tends to "break" the O-rings loose from the piston, before any appreciable translatory or linear motion of the piston begins. This means that, due to the spiral or helical piston motion utilized in the present invention, much less force is required to operate the valve of this invention, than is required for prior "linear" valves. In fact, as will appear hereinafter, the torque developed by a small, inexpensive, commercially-available rotary solenoid is ample for operating the valve of the present invention.

Reference will now be made to FIGS. 2–5, which illustrate a practical embodiment of a fluid sampling valve utilizing the principles previously set forth.

In the fluid sampling valve, fluid connections to the various disks are made through channels formed by matching holes in the disks, these channels leading down into the base or bottom end cap 7, where tubing fittings are provided to make external connections. The seals along these channels are made by small O-rings between the disks.

For convenience and ease of manufacture, all six of the disks have the same basic construction, followed by individual modifications to be described hereinafter. Refer to FIGS. 3 and 4. Each basic disk or wafer has an axial hole or bore 40 therethrough (to constitute one portion of the cylinder in which piston 9 opertates), with a concentric upstanding annular boss 41 on one circular face of the disk and a concentric annular recess 42 on the opposite circular face thereof. When the disks are assembled or stacked, the annular boss 41 of one disk fits with small clearance into the annular recess 42 of the next adjacent disk, and this combined structure of the adjacent disks defines an annular groove (radially within the aforesaid annular boss) in which is mounted an O-ring. The O-rings 12, 14, 16, 18, and 20, which are mounted in the respective grooves above described, sealingly engage the outer surface of the piston member 9 and thus provide the plurality of annular chambers 10, 13, 15, 17, 19, and 21 previously described. The bottom end cap 7 likewise has a concentric upstanding annular boss, surrounding its central hole, which fits with small clearance into the adjacent annular recess of disk 1 to form an annular groove (radially within the cap boss) in which O-ring 11 is mounted.

At the opposite end of the valve, the top or upper end cap 8 has a concentric annular recess, surrounding its central recess 34, whose wall forms, along with the external cylindrical wall of the upstanding annular boss of disk 6, an annular groove (radially beyond the boss of disk 6) in which O-ring 22 is mounted. Recess 34, which is closed at its upper end, is concentric with the central holes in disks 1 through 6 and is thus concentric with the longitudinal axis of piston member 9, when the valve is assembled. A bearing 35, mounted in recess 34, rotatably supports one end of piston 9.

In addition to the construction previously described, each basic disk has three parallel holes 36 therein, these holes extending parallel to the longitudinal axis of the disk and having their centers spaced 90° apart on the circumference of a base circle centered at the center of the disk. This base circle may have a diameter of ¾ in., by way of example. Surrounding each of the holes 36, and concentric therewith, is a respective annular groove 37, these grooves 37 being sized (in diameter and depth) to each accommodate therein a small O-ring. These O-rings would be concentric with the holes 36. Centered on the aforementioned base circle, at the fourth quadrantal position, is a similar annular groove 38.

Further, each basic disk has a radially-extending bore 39 whose center line lies in a vertical plane passing through the said fourth quadrantal position of the base circle and whose inner end communicates with the central disk bore 40; the length of bore 39 is thus substantially coextensive with the radius of the disk.

Each basic disk also has drilled therein four holes for screws, to be described hereinafter.

Starting with the basic disk construction previously described in connection with FIGS. 3 and 4, each of the disks 2 and 5 is modified simply by reaming the outer end of bore 39 to a slightly larger diameter, the length of this reamed diameter being such that the two ends of a length of tubing 25 constituting the sample volume may be welded directly into the disks 2 and 5, respectively. Thus, the bores 39 in disks 2 and 5 correspond to ports 24 and 26, respectively, in FIG. 1A.

Starting with the basic disk construction previously described in connection with FIGS. 3 and 4, each of the disks 1, 3, 4, and 6 is modified in a manner which will now be described. Concentrically with annular groove 38, a hole 43 (see FIG. 2) is drilled parallel to the longitudinal axis of the disk, this hole extending from one face of the disk to intersect or communicate with the bore 39. Hole 43 extends from that face of the disk which is closer to the base 7 when the valve is assembled as illustrated in FIG. 2, and such hole forms, in conjunction with or in combination with the radially-extending bore 39, a continuous channel which starts from one face of the disk and first extends in a direction parallel to the disk longitudinal axis, then turns 90° and extends radially inwardly of the disk to its central axial bore 40 (FIG. 4). Annular groove 38 is sized to accommodate therein a small O-ring, concentrically with hole 43. Besides the hole 43 added as described, each of the disks 1, 3, 4, and 6 is further modified by plugging or sealing that portion of the length of bore 39 which extends radially outwardly beyond hole 43; as previously described, hole 43 intersects bore 39.

The disks 1 through 6 are assembled in the manner illustrated in FIGS. 2 and 5, which are sectional views taken at right angles to each other. The base or bottom end cap piece 7 has therein four fluid flow passages 44, 45, 46, and 47, each of which is provided with a tubing fitting (not shown) at its outer end (for making external connections), and each of which first extends radially inwardly, from the outer cylindrical face of the cap piece, a distance sufficient for its radially-inner end to be aligned with the holes 36 or the hole 43 in disk 1, and then extends in a direction parallel to the longitudinal axis of the disks, so that the inner end of each of the passages 44, 45, 46, and 47 communicates with one of the holes 36 or with hole 43 in disk 1. The fittings at the ends of the four flow passages 44–47 are spaced at 90° intervals around the circumference of cap piece 7.

Passage 44 is the initial part of the "Sample In" port 23 of FIG. 1A, and this port connection extends by way of matching or aligned hole 43 and bore 39 in disk 1 to the annular chamber 10 (FIG. 1A). Passage 44, and hole 43 and bore 39 of disk 1, in combination, thus correspond to port 23 in FIG. 1A. A seal along the "Sample In" port just described is made by an O-ring 48, positioned in groove 38 of disk 1.

Passage 45 is the initial part of the "Carrier In" port 27 of FIG. 1A, and this port connection extends by way of matching or aligned holes 36 in disks 1 and 2, and by way of hole 43 and bore 39 in disk 3, to the annular chamber 15( FIG. 1A). Passage 45, holes 36 in disks 1 and 2, and hole 43 and bore 39 in disk 3, in combination, thus correspond to port 27 in FIG. 1A. Seals along the "Carrier In" port just described are made by an O-ring 49 in one of the grooves 37 of disk 1, by an O-ring 50 in one of the grooves 37 of disk 2, and by an O-ring 51 positioned in groove 38 of disk 3.

Passage 46 is the initial part of the "To Chromatograph Column" port 28 of FIG. 1A, and this port connection extends by way of matching or aligned holes 36 in disks 1, 2, and 3, and by way of hole 43 and bore 39 in disk 4, to the annular chamber 17 (FIG. 1A). Passage 46, holes 36 in disks 1, 2, and 3, and hole 43 and bore 39 in disk 4, in combination, thus correspond to port 28 in FIG. 1A. Seals along the "To Chromatograph Column" port just described are made by an O-ring 52 in one of the grooves 37 in disk 1, by an O-ring 53 in one of the grooves 37 of disk 2, by an O-ring 54 in one of the grooves 37 of disk 3, and by an O-ring 55 positioned in groove 38 of disk 4.

Passage 47 is the initial part of the "Sample Out" port 29 of FIG. 1A, and this port connection extends by way of matching or aligned holes 36 in disks 1, 2, 3, 4, and 5, and by way of hole 43 and bore 39 in disk 6, to the annular chamber 21 (FIG. 1A). Passage 47, holes 36 in disks 1, 2, 3, 4, and 5, and hole 43 and bore 39 in disk 6, in combination, thus correspond to port 29 in FIG. 1A. Seals along the "Sample Out" port just described are made by an O-ring 56 in one of the grooves 37 of disk 1,, by an O-ring 57 in one of the grooves 37 of disk 2, by an O-ring 58 in one of the grooves 37 of disk 3, by an O-ring 59 in one of the grooves 37 of disk 4, by an O-ring 60 in one of the grooves 37 of disk 5, and by an O-ring 61 positioned in groove 38 of disk 6.

Summarizing the foregoing, fluid connections to the various disks are made through channels formed by matching holes in the disks; these channels lead down into the base piece 7, where tubing fittings are provided to make external connections. The seals along the channels are made by small O-rings 48, 49, 50, etc. between the disks. Connections to the sample volume 25 are made by welding tubing directly to disks 2 and 5.

FIGS. 2 and 5 illustrate the "purge" position of the valve. With the piston holes 30, 31, and 32 in the position illustrated, sample flows through passage 44, the angled channel in disk 1, chamber 10, piston hole 30, chamber 13, the radial bore in disk 2, tubing 25, the radial bore in disk 5, chamber 19, piston hole 32, chamber 21, the angled channel in disk 6, aligned straight channels in disks 5, 4, 3, 2, and 1, and the passage 47 to "Sample Out." Carrier gas flows through passage 45, aligned straight channels in disks 1 and 2, the angled passage in disk 3, chamber 15, piston hole 31, chamber 17, the angled passage in disk 4, aligned straight channels in disks 3, 2, and 1, and the passage 46 to the "Chromatograph Column" fitting.

When the valve is moved to its "sampling" position, the flow of sample is interrupted at chamber 10 by piston 9, since the piston hole 30 is now no longer in communication with this chamber. This cuts off one end of the sample volume from the sample source. Also, "Sample Out" flow is interrupted at chamber 21 by piston 9, since the piston hole 32 now connects this latter chamber only to the closed chamber formed above or to the left of disk 6. This cuts off the other end of the sample volume from the sample vent. Now, carrier gas flows through passage 45, aligned straight channels in disks 1 and 2, the angled passage in disk 3, chamber 15, piston hole 30 (now in the position illustrated in FIG. 1B), chamber 13, the radial bore in disk 2, tubing 25, the radial bore in disk 5, chamber 19, piston hole 31 (now in the position illustrated in FIG. 1B), chamber 17, the angled passage in disk 4, aligned straight channels in disks 3, 2, and 1, and the passage 46 to the "Chromatograph Column" fitting.

The principles utilized for the construction of the disk can be extended to provide a more advanced or more universal or more sophisticated type of valve, one which will provide a choice of either an internal (built-in) or an external sample volume. It may be appreciated that the tubing 25 previously described provides an internal sample volume. To extend the principles in the manner just referred to, six tubing fittings and six channels, rather than four, would be provided in the base piece 7. Also, on the base circle of the basic disk (see FIG. 3), six equiangularly-spaced annular grooves for O-rings would be utilized, together with the number of holes (in the longitudinal or radial direction) needed to provide six channels through the disks to the base piece 7, one channel for each of the six fittings in the base. The two additional disk channels (over and above the four channels described in connection with FIGS. 2 and 5) could be associated with disks 2 and 5, respectively (by proper assembly of the disks), and would lead respectively to the two additional tubing fittings in base piece 7, which latter would then be "Sample Volume" fittings and could be connected respectively to opposite ends of an external sample volume.

The piston member 9 (which has therein the diagonal holes 30, 31, and 32) passes through the aligned central or axial holes 42 in all six of the disks and is sealingly engaged by the O-rings 11, 12, 14, 16, 18, and 20, thereby to form the separated annular chambers, as previously described. One end of this piston is journaled in the bearing 35, which as described is mounted in the internal recess 34 of the top cap piece 8.

Below or to the right of disk 1, piston 9 passes freely through a central axial bore provided in the base piece 7 and is journaled in a bearing 62 which is mounted in a suitable upstanding annular boss provided on the right-hand or bottom end of base piece 7. Below or to the right of bearing 62, the end of piston 9 is secured (pinned) to an actuating member 63 which is generally cylindrical in outer configuration. Member 63 has cut in its outer surface a square thread or spiral 64 which is very coarse, e.g. two threads per inch.

A mounting plate 65, having a central circular hole 66 therein, is securely fastened to the bottom or right-hand circular end face of base piece 7, for example by a pair of diametrically-opposite screws (not shown) which pass through the plate 65 and thread into tapped holes in base or bottom cap piece 7. A bracket 67 is firmly secured to the outer face of plate 65, at hole 66. A pin 68, on one end of which is journaled a more or less cylindrical roller 69, is rigidly attached to bracket 67 and extends downwardly from such bracket. Roller 69 is constructed and arranged to fit into the square thread or spiral 64 provided in member 63, with the cylindrical side wall of the roller engaging the opposite side walls of the spiral. Thus, as member 63 is rotated by means hereinafter described, the stationary or fixed roller 69, engaging the walls of spiral 64, forces member 63 to move in a translatory or sidewise direction (i.e., horizontally in FIG. 2). That is to say, member 63, and piston 9 secured thereto, are caused to have a combined rotary and translatory movement (i.e., a helical movement) with respect to the axis of the disks. Since the spiral or thread 64 has two threads per inch, the member 63 and the piston 9 will advance (or move in a translatory direction) a distance of one-eighth of an inch when member 63 is rotated through ninety degrees. It will of course be appreciated that it is the translatory or horizontal movement of piston 9 which is most important in switching the fluid flow connections of the valve from FIG. 1A position to the FIG. 1B position.

A radially-extending arm 70, which is bifurcated at its outer end, is pinned as at 71 to the right-hand or bottom face of member 63. An elongated stud 72, which is firmly secured to a radially-extending arm 73 near the outer end thereof, passes through the space between the two tines at the outer forked end of arm 70 and thus is adapted to coact with the bifurcated end of arm 70. The structure described permits horizontal movement of arm 70 relative to stud 72. Preferably, to enable a proper initial adjustment of the device, arm 73 is provided with an arcuate slot, and stud 72 has locking means to enable it to be secured or locked in any desired position along the length of such slot. As illustrated, stud 72 has a threaded shank portion which extends through the arcuate slot in arm 73, and a nut 74 engages the threads of this shank and bears against that face of arm 73 which is opposite to the main body of the stud.

At its inner end, arm 73 is rigidly attached to a collar 75 which is in turn pinned to the output shaft 76 of a motor actuator 77, which may be a so-called "Ledex rotary solenoid." Motor actuators of this type are commercially available, and the operation of same is well-known to those skilled in the art. Suffice it to say here that, when appropriate electrical energy is applied to the windings of the solenoid, the output shaft 76 of the rotary solenoid is made to rotate through an angle of approximately ninety degrees, causing rotation of arm 73 and stud 72 through a similar angle. Stud 72, engaging arm 70, rotates such arm and member 63 through a similar angle. This produces a helical movement of piston 9, as previously described, the translatory component of which shifts the fluid flow connections of the valve as hereinabove described.

To mount the rotary solenoid 77 in position, the mounting bolts 71 thereof are secured (as by means of nuts 79) to a mounting plate 80 which is in turn secured to two oppositely-disposed support members 81 whose ends are in turn fastened to plate 65.

Refer now to FIG. 6. The stack of disks 1–6 is held together by two diametrically-opposite machine screws 82 and 83 which pass through aligned holes 84 and 85 (see FIG. 3), respectively, in each of the disks and thread into tapped holes in the top cap piece 8. When the valve is assembled, the heads of screws 82 and 83 fit into holes 86 and 87, respectively, in the base piece 7. The holes 86 and 87 are of different depths, and one screw 83 has an extra long head which keys into the deeper hole 87 in base piece 7. The use of this "key" arrangement ensures that the valve will be assembled properly.

The stack of disks, which comprises all of the working parts of the valve except the piston 9, is fastened to the base piece 7 by means of two screws 88 and 89 which pass through aligned holes 90 and 91 (see FIG. 3), respectively, in each of the disks 1–6, and through respective holes in the top cap piece 8, and thread into tapped holes 92 and 93 in the bottom piece or base 7. The construction described provides an important feature of the invention. By simply removing the two screws 88 and 89, the stack of disks may be removed and replaced by another stack (which latter has previously been assembled in the laboratory or shop). Thus, the valve may be essentially replaced in a simple and convenient manner; it will be recalled that the stack of disks comprises substantially all of the working parts of the valve.

A summary of the main features of the valve of this invention will now be given. The main valve body is a stack of specially-designed disks (or wafers), with O-ring seals in between. The stack of disks forming the main valve body is small, having for example a diameter of 1½" and a length of 1¼". The main valve body (stack of disks) can be quickly replaced, by removing only two machine screws. There are no critical dimensions or surfaces on the disks of the valve body; thus, the disks are easily and inexpensively made. The piston must be highly polished, to keep friction between it and the O-rings down to a minimum. The valve actuator (rotary solenoid) delivers power to the valve by rotary motion.

The invention claimed is:

1. In a valve, a plurality of similar discs each having a central bore therethrough, means securing said discs together in stacked relation to form a valve body wherein the aligned central bores provide a cylinder, each of said discs having a plurality of longitudinally-extending holes therein some of which are aligned with respective holes in the other discs to form a plurality of longitudinally-extending fluid passages and each disc having also a transversely-extending hole communicating with the central bore in the same disc, certain of said longitudinally-extending passages being in fluid communication with certain of said transversely-extending holes; a piston member mounted for movement in said cylinder, and an O-ring fixedly mounted between each pair of adjacent discs and sealingly engaging the outer surface of said member to separate the annular space between said member and the wall of said cylinder into a plurality of annular chambers with which said transversely-extending holes respectively communicate, said member having therein a channel operating to interconnect a pair of adjacent chambers selected in accordance with the position of said member.

2. Valve structure as set forth in claim 1, including also means for moving said piston in said cylinder, thereby to select for interconnection, by way of said channel, a different pair of annular chambers.

3. Valve structure as defined in claim 1, wherein said piston member is mounted to move in a helical path with respect to the axis of said cylinder.

4. Valve structure as set forth in claim 1, including also means for causing said piston member to move in a helical path with respect to the axis of said cylinder.

5. Valve structure in accordance with claim 4, wherein the piston moving means includes a rotary solenoid having an actuating arm mechanically coupled to said piston member.

6. Valve structure as set forth in claim 1, including also O-rings positioned between pairs of adjacent discs and surrounding said longitudinally-extending passages.

References Cited in the file of this patent

UNITED STATES PATENTS

| | | |
|---|---|---|
| 2,887,127 | Broadbent | May 19, 1959 |
| 2,965,131 | Oros | Dec. 20, 1960 |
| 2,989,988 | Rudelick | June 27, 1961 |
| 3,044,491 | Sangster | July 17, 1962 |

FOREIGN PATENTS

| | | |
|---|---|---|
| 1,141,238 | France | Mar. 11, 1957 |